(12) United States Patent
Fernandez et al.

(10) Patent No.: US 11,544,746 B2
(45) Date of Patent: Jan. 3, 2023

(54) AUTOMATED SELF-SERVE SMART BILLBOARD

(71) Applicants: Bismark Fernandez, Yakima, WA (US); Rafael Fernandez, Yakima, WA (US)

(72) Inventors: Bismark Fernandez, Yakima, WA (US); Rafael Fernandez, Yakima, WA (US)

( * ) Notice: Subject to any disclaimer, the term of this patent is extended or adjusted under 35 U.S.C. 154(b) by 0 days.

(21) Appl. No.: 16/830,438

(22) Filed: Mar. 26, 2020

(65) Prior Publication Data

US 2020/0311775 A1 Oct. 1, 2020

Related U.S. Application Data

(60) Provisional application No. 62/823,674, filed on Mar. 26, 2019.

(51) Int. Cl.
| | |
|---|---|
| *G06Q 30/00* | (2012.01) |
| *G06Q 30/02* | (2012.01) |
| *G06Q 30/04* | (2012.01) |
| *G06Q 10/10* | (2012.01) |
| *G09F 9/30* | (2006.01) |

(52) U.S. Cl.
CPC ......... *G06Q 30/0273* (2013.01); *G06Q 10/10* (2013.01); *G06Q 30/0264* (2013.01); *G06Q 30/0276* (2013.01); *G06Q 30/04* (2013.01); *G09F 9/30* (2013.01)

(58) Field of Classification Search
CPC ................................ G06Q 10/10; G09F 9/30
See application file for complete search history.

(56) References Cited

U.S. PATENT DOCUMENTS

| | | | |
|---|---|---|---|
| 7,098,869 B2 | 8/2006 | Vaitekunas et al. | |
| 10,339,570 B2 | 7/2019 | Spooner et al. | |
| 2004/0267634 A1 | 12/2004 | Mahabadi et al. | |
| 2005/0021393 A1* | 1/2005 | Bao | H04L 29/06 |
| | | | 705/14.64 |
| 2012/0150586 A1* | 6/2012 | Harper | G06Q 30/0204 |
| | | | 705/7.33 |
| 2012/0191549 A1 | 7/2012 | Myers | |
| 2013/0091024 A1 | 4/2013 | Etherington et al. | |
| 2014/0149221 A1 | 5/2014 | Rycyna, III | |

(Continued)

*Primary Examiner* — Alvin L Brown
(74) *Attorney, Agent, or Firm* — Volta Law Group

(57) ABSTRACT

A system and method for providing automated remote digital advertising, and more specifically, a system and method for providing a fully automated self-serve smart billboard or display device. is disclosed. The Smart Billboard system consists of a user smart device, a billboard with a display processing system, and a billboard operator server. The user smart device is constructed using a user app processor, a user interface, a content creator, a content uploader, an ad scheduler, a payment processor, a login processor, and a smart device network interface. The billboard display processing system may include an upload controller, a billboard network interface, a display processor, a traffic and content receiver, an external imaging device, and a billboard system data store. The billboard operator server may include an operator processor, a billboard content scheduler, an account manager, a content approver, and a live image receiver.

20 Claims, 6 Drawing Sheets

(56) References Cited

U.S. PATENT DOCUMENTS

| | | |
|---|---|---|
| 2014/0337137 A1 | 11/2014 | Robertson et al. |
| 2017/0032399 A1* | 2/2017 | Golden ................ H04W 4/029 |
| 2018/0096395 A1* | 4/2018 | Friedl ................ G06Q 30/0266 |
| 2018/0174188 A1 | 6/2018 | Wilkinson et al. |
| 2019/0339925 A1* | 11/2019 | Lorenz .................... H04L 67/10 |

* cited by examiner

AUTOMATED SELF-SERVE SMART BILLBOARD

CROSS-REFERENCE TO RELATED APPLICATIONS

This application claims priority to U.S. Provisional Patent Application No. 62/823,674, titled "FULLY AUTOMATED SELF-SERVE SMART BILLBOARD," and filed on Mar. 26, 2019. The entire application is incorporated herein by reference in its entirety.

TECHNICAL FIELD

This application relates in general to a system and method for providing automated remote digital advertising, and more specifically, to a system and method for providing a fully automated self-serve smart billboard or display device.

BACKGROUND

In the existing billboard advertising system, the customer often does not have real-time availability of billboard advertising space so the customer must contact the billboard operator directly to verify availability of billboard advertising space.

The conventional methods of how content is uploaded to billboards, for example, require a billboard operator to approve contents requested by a customer to be displayed on a billboard. The operator typically is required to login into a computer, connect to the billboard data system or a billboard's software or application, then select the images and upload them. When a customer needs to upload contents to a billboard when the billboard operator is closed for business, the contents may be required to wait until a next business day before a system uploads the customer-selected content to the selected billboard.

Even systems that permit transmitting content and the customer approval of content over the Internet for streaming purposes, for example, do not allow the customer or client to directly connect to a display device or a display device's software or application(s) and upload content on their own. Special software, applications or "patches" are required for the servers or computer systems to recognize billboards from various manufactures and the software or application(s) of various billboards. Without additional software, application(s) or "patches,' servers or computer systems cannot recognize, communicate, control or transfer data between the billboards.

Most prior art solutions require an administrator or operator to approve content and do not provide an option that permits specified customers to transfer or upload contents or data to the display device without having to go through an administrator's approval process.

Additionally, other prior art solutions do not specify the format in which content will be displayed on the display device or permit customers to designate what part of the display device will be used to visualize the content. The systems no do not typically accept content that is always recognizable by the billboard and displayed in the content's interpretative format or recognizable form. In other words, most systems do not specify if a file containing content or any embedded content codes will be properly displayed on a display device. Customers need systems in which the content will be displayed on the screen of any sign, billboard or display device in its decoded form.

Existing methods to upload advertising content to a billboard are often inefficient and require that the billboard operator manually upload the file(s) of the content to be displayed on the billboard. The client often is required to produce advertising and send the content to the operator via e-mail or the operator's website, or even hand-deliver a physical, removable file storage device, so the content can upload to a server. The operator then uploads the content to the digital billboard manually via remote connection to the digital billboard. Current methods of digital billboard advertising fail to take advantage of smart devices, servers, or computer system capabilities. Customers often need to change billboard advertising content immediately and often in order to reflect business activities and changes, but the current method may cause a significant delay in uploading new content.

Additionally, many government, environmental, and law enforcement agencies utilize digital billboards to alert the public about wanted criminals, chemical spills, potential weather hazards, amber alerts, silver alerts, and other time-sensitive announcements. These announcements are critical, but current methods to upload content impose a significant delay and do not permit after-hours updates. Current billboards participate in a Federal Bureau of Investigation (FBI) initiative to post public notices that may benefit from real-time updates and law enforcement agencies, especially, would benefit from real-time uploads and updates.

Federal, state, and local government offices, as well as medical organizations, also post important messages regarding public health initiatives, such as breaking information about disease outbreaks and steps to take in the case of illness or injury. Again, the current digital billboard advertising method imposes a significant delay in uploading or updating this critical content.

Therefore, a need exists for a web-based application that provides a system and method for providing a fully automated self-serve smart billboard or display device. The present invention attempts to address the existing limitations of current display device industry practices by providing a system and method for a fully automated self-serve smart billboard or display device according to the principles and example embodiments disclosed herein. The present invention addresses the above limitations of the prior art and improves the convenience and speed in which advertising and public service content is uploaded by a client to a digital billboard and allows the digital advertising content to be changed anytime while at the same time taking advantage of the widely and readily available smart device applications. This invention allows billboards to be used or managed by anyone with access or privileges, at any time of the day or night, from any location, and without waiting for approvals, especially when content is time-sensitive.

SUMMARY

In accordance with the present invention, the above and other problems are solved by providing a system and method for a fully automated self-serve smart billboard or display device according to the principles and example embodiments disclosed herein.

In one embodiment, the present invention is a system for providing a fully automated self-serve smart billboard. The Smart Billboard System consists of a user smart device, a billboard with a display processing system, and a billboard operator server. The user smart device is constructed using a user app processor, a user interface, a contract/invoice generator, a content creator, a content uploader, an ad scheduler, a payment processor, a login processor, and a smart device network interface. The billboard display processing system may include an upload controller, a billboard network interface, a display processor, a traffic and content receiver, an external imaging device, and a billboard system data store. The billboard operator server may include an operator processor, a billboard content scheduler, an account manager, a content approver, and a live image receiver.

In another embodiment, the present invention is a method for providing a fully automated self-serve smart billboard. The great utility of the invention is that a method for providing a fully automated self-serve smart billboard in which advertising content may be uploaded directly to a billboard processing system by a user without intervention of a billboard operator.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
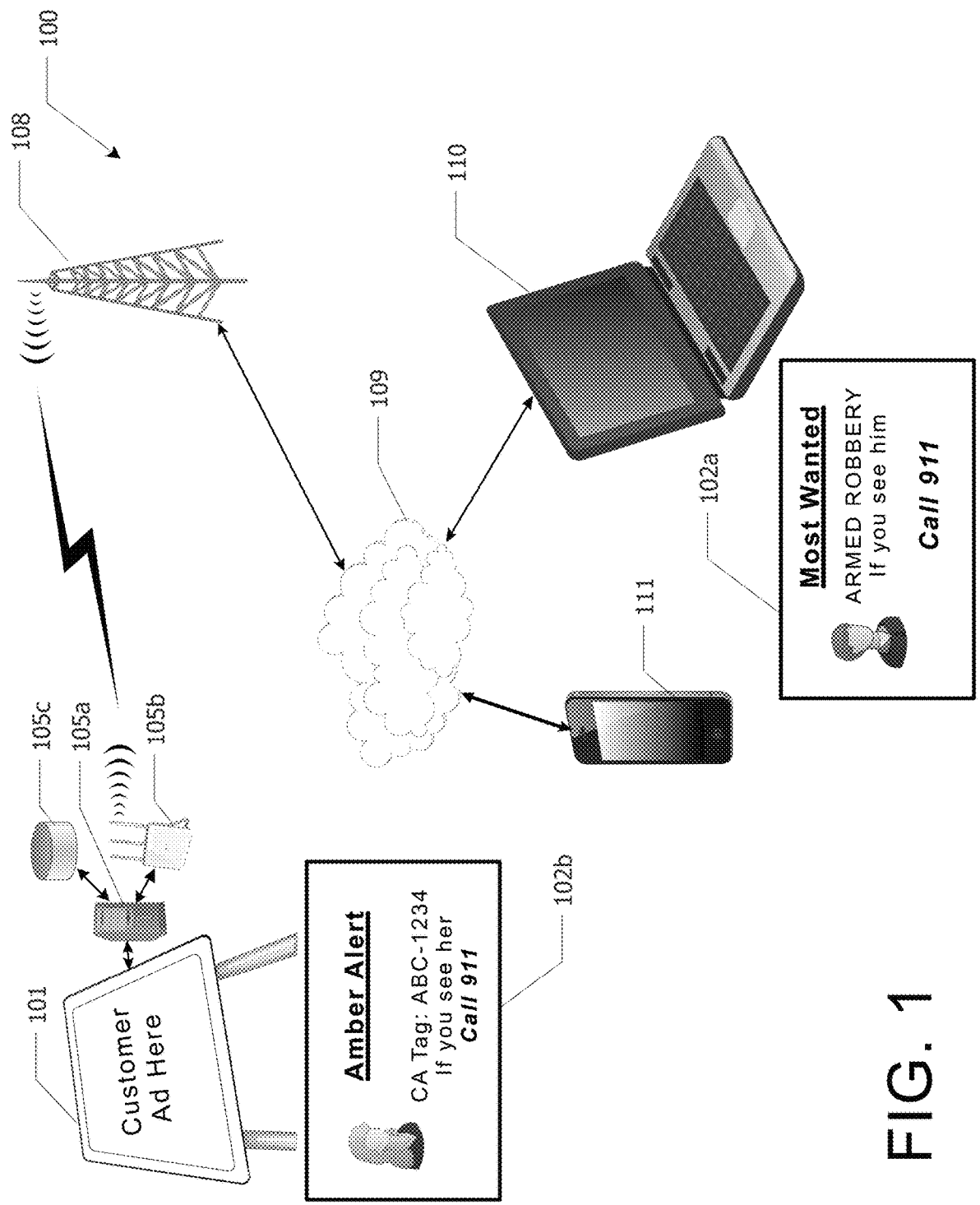
FIG. 1 illustrates an example embodiment for a system that provides a system and method for a fully automated self-serve smart billboard according to the present invention.

This application relates in general a system and method for providing automated remote digital advertising, and more specifically, to a system and method for providing a fully automated self-serve smart billboard or display device according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "50-250 micrometers" should be interpreted to include not only the explicitly recited values of about 50 micrometers and 250 micrometers, but also include individual values and sub-ranges within the indicated range. Thus, included in this numerical range are individual values such as 60, 70, and 80 micrometers, and sub-ranges such as from 50-100 micrometers, from 100-200, and from 100-250 micrometers, etc.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specifications and claims are approximations that may vary depending upon the desired properties sought to be obtained by the present disclosure. At the very least, and not as an attempt to limit the application of the doctrine of equivalents to the scope of the claims, each numerical parameter should be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a smartphone, tablet, and/or web browser on any computing device.

The terms "customer," "client," and "user" refer to an entity, e.g. a human, using the Fully Automated Self-Serve Smart Billboard including any software or smart device application(s) associated with the invention. The term user herein refers to one or more users.

The term "connection" refers to connecting any component as defined below by any means, including but not limited to, a wired connection(s) using any type of wire or cable for example, including but not limited to, coaxial cable(s), fiberoptic cable(s), ethernet cable(s) or wireless connection(s) using any type of frequency/frequencies or radio wave(s). Some examples are including below in this application.

The term "sign copy" means the visually communicative elements of a billboard or billboards, including but not limited to words, letters, numbers, designs, figures, images, videos, sounds or other symbolic presentations incorporated into a display device with the purpose of attracting attention to the subject matter or message. Sign copy may be used interchangeably with "billboard display," "billboard screen" or "screen."

The term "billboard" refers to any type of display device with capabilities to change the sign copy using similar technologies, including but not limited, to LED (light emitting diode) or similar technologies, liquid crystal or digital ink technology or displays. Billboard may be used interchangeably with "digital billboard" or "display device." Billboard referred herein also may have the capabilities to connect to the internet via wired connection and/or wireless fidelity and/or wireless mobile internet or similar wireless technology or any frequency of radio waves. Billboard referred herein also may have capabilities to store content in its own memory of any form.

The term "content" refers to the digital file(s), or any coded language or data of the images, videos, text or sound (where permitted) that can be sent between any of the components, devices or display devices. The term content refers to one or more contents.

The term "billboard operator" refers to the person or person(s) that upload the contents to the billboard for a user. Here billboard operator may be used interchangeably with "customer service," "customer service personnel," "customer service representative," "owner," "operator" or "administrator." The terms billboard operator, owner, customer service, customer service personnel or customer service representative may refer to one or more billboard operators, owners, customer services, customer service personnel or customer service representative.

The term "invention" or "present invention" refers to the invention being applied for via the patent application with the title "Automated Self-Serve Smart Billboard." Invention may be used interchangeably with "Self-Serve Billboard," "Self-Serve Smart Billboard" or "Fully Automated Self-Serve Billboard."

The term "TV" refers to television.

The term "smart device" refers to any current technologies such as, but not limited to, tablets, smart TVs, computers or laptops, mobile telephone devices, media player devices, smart watches, game consoles or digital assistant devices such as a personal digital assistant (PDA). Smart device may also include any computation or communication device, such as a device that is capable of communicating and transferring or receiving data or content via a network, Internet or server regardless if it is a wired or wireless connection of any type. "User device" or "device" may be used interchangeably with smart device. Smart device may include any input component such as a touch screen, remote control device, a game controller, keyboard, mouse, keypad or microphone (for example to use the invention's optional feature of voice command, voice control of any of the invention's features or to dictate text for any use in the invention). Smart device may refer to the user's smart device or the operator's smart device.

The term "upload" refers to uploading content by users or operators to either a server or servers which the operator will have access to and/or uploading content to a billboard's data storage system or memory. Uploading content may be either to a server, servers or computer system with the capabilities to communicate with the billboard(s) and/or transfer or receive data to and from the billboard(s) and/or control any feature, parameter or settings of the billboard(s) and/or directly connecting to the billboard(s) via any means wireless and/or wired and upload content to the billboard(s) memory storage. Upload may also be to a computer or other smart device that is connected to a billboard(s) and used to control or modify any settings and parameters of the billboards or upload or delete content in the billboards' memory storage device or system.

The term "audience" refers to person or persons who will visualize the billboard(s) or the sign copy of the billboard. FIG. 1 illustrates an example of sign copy on a billboard.

The term "component" refers to any part of the invention or any part or device used to transmit or receive data or connect the user device with the billboard. Components may also include, but are not limited to, the cell tower or any data transmission or receiving device(s), internet service provider, Internet or World Wide Web. Devices, user devices or smart devices are also components. Any component(s) or device(s) may be connected with any other component(s) or device(s) via wired and/or wireless connection or connections.

The terms "communicate" or "communication" refer to any component(s) connecting with any other component(s) in any combination for the purpose of the connected components to communicate and/or transfer data to and from any components and/or control any settings, parameters, or displayed content(s) to any other component.

The term "advertisement" refers to any sign copy, display content, or public service announcement that might be uploaded or updated on a billboard or display device.

In general, the present disclosure relates a system and method for providing automated remote digital advertising, and more specifically, to a system and method for providing a fully automated self-serve smart billboard or display device. To better understand the present invention, FIG. 1 illustrates an example embodiment for a system 100 for providing a system and method for providing a fully automated self-serve smart billboard according to the present invention.

To provide the most convenient means for a user to display picture or video content on a nearby or remote digital billboard 101 with a computer or smart device via the internet with the assistance of software, website(s) or smart device application(s), a user needs to bypass the assistance of a billboard operator/owner. This system 100 will allow the user(s) to change the contents of the digital billboard 101 at any time as many times as desired.

The system 100 will also allow the user to send the content to be displayed on the billboard 101 by any means described in the present application, including but not limited to, the invention's software or application(s) made for any smart device, MMS/text messaging, and the billboard operator's or owner's website by uploading it to a server or servers or computer system(s) or any internet messaging system. The system 100 may also include features to filter content based on a telephone number or email, for example to prevent spam. The system 100 may also include features to verify that the users are humans, for example using similar filtering programs such as the well-known reCAPTCHA or other web-based, software-based or application-based filtering systems.

FIG. 1 illustrates how a remote computer 110 or smart device 111 may be connected either via an internet connection 109 permitting a user to upload content to be displayed on the billboard 101 or delete content currently or previously displayed on the billboard. The billboard 101 may connect to the Internet via a wired connection using any type of conductive wire(s) or cable(s) and/or wireless fidelity and/or any other wireless means, radio waves or frequency, such as for example, a mobile wireless network. FIG. 1 illustrates examples of various types of connections, including a mobile wireless connection via a cell tower 108 for billboards that have these capabilities. FIG. 1 also illustrates examples of how a remote computer 110 or smart devices 111 may connect to the internet 109 to communicate with any other component.

In this system 100, the contents sent or transmitted to the display device 101 will be recognizable and interpretable by the display device. The display device 101 will then be able to convert this content, whether it is any type of data or codes, into an image or video on the screen of the display device 101 with the same or similar appearance intended by the creator, user or operator of the content. The display device 101 may be any type of device with the capabilities to change the sign copy, the contents visualized on the display device, commonly referred to as changeable sign copy, utilizing the following technologies or similar technologies such as but not limited to LED, liquid crystal or digital ink displays and may be of any size or shape and may be located in public or private locations for the purpose of leasing or donating advertising space to user or customers. The display device may also be useful for any on-premise advertising purposes. For example if a business wants to have a digital display on their business property to generate additional revenue from supported billboards capable of displaying sign copy images and the like. System 100 may also be retrofittable to any existing digital billboard 101.

The Self-Serve Smart Billboard 100 is a system and method that utilizes an add-on to current conventional technologies to allow customers to directly access a billboard or billboards without the intermediate customer service or billboard operator. This invention will allow the customers to bypass the assistance of customer service or billboard operators. This system 100 allows the use of software or smart device applications from various devices to upload content such as images and/or videos in any file format to a billboard 101 with the ability to change the sign copy. The billboard 101 may utilize LED displays or similar technologies, liquid crystal or digital ink billboards or displays. Billboard 101 typically includes a data processing system 105 consisting of a processing unit 105a, a wireless network connection 105b, and local data storage 105c. Uploaded content is stored onto the local data storage 105c and periodically retrieved by the processing unit 105a and output to the billboard 101. The processing unit 105a maintains and follows a predetermined schedule to display content during various time slots purchased by a customer.

The invention may use any type of network such as a single network, multiple networks of a same type, or multiple networks of different types which may include one or more of a direct connection between devices, including but not limited to a local area network (LAN), a wide area network (WAN) (for example, the Internet), a metropolitan area network (MAN), a wireless network (for example, a general packet radio service (GPRS) network), a long term evolution (LTE) network, a telephone network (for example, a Public Switched Telephone Network or a cellular network), a subset of the Internet, an ad hoc network, a fiber optic network (for example, a fiber optic service (often known as FiOS) network), or any combination of the above networks.

Smart devices mentioned herein the present application may also use one or more sensors to receive or send signals, such as wireless signals for example, Bluetooth™, wireless fidelity, infrared, Wi-Fi, or LTE. Any smart device mentioned in this application may be connected to any other component or smart device via wired communications (e.g., conductive wire, coaxial cable, fiber optic cable, ethernet cable, twisted pair cable, transmission line, waveguide, etc.), or a combination of wired and wireless communications. The invention's method and/or system may use a single server device or a collection of multiple server devices and/or computer systems.

The systems and methods described above, may be implemented in many different forms of applications, software, firmware, and hardware. The actual software or smart device application codes or specialized control software, hardware or smart device application(s) used to implement the invention's systems and methods is not limiting of the implementation. Thus, the operation and behavior of the systems and methods were described without reference to the specific software or firmware code. Software, smart device application(s), firmware, and control hardware can be designed to implement the systems and methods based on the description herein.

This new invention also has the ability to manage, control or communicate with multiple or unlimited number of billboards from one or more server or computer system location without the intervention of the operator or operators or anyone with access or privileges to use this new invention. For example, one or more billboards can be managed or controlled or communicated with one or more servers, computer systems, or smart devices from one or more locations. To further exemplify, the user will be able to control or communicate with as many billboards as desired from one centralized location if desired or more than one location.

While all of the above functions are described to be provided to users via a mobile application on a smartphone, one of ordinary skill will recognize that any computing device including tablets, laptops, and general purpose computing devices may be used as well. In at least one embodiment, all of the services described herein are provided using web pages being accessed from the central server 320 and the billboard display processing system 105 using a web browser such as Safari™, Firefox™, Chrome™, DuckDuckGo™, and the like. All of the screen examples described herein show user interface elements that provide the functionality of the present invention. The arrangement, organization, presentation, and use of particular user input/output (I/O) elements including hyperlinks, buttons, text fields, scrolling lists, and similar I/O elements are shown herein for example embodiments only to more easily convey the features of the present invention. The scope of the present invention should not be interpreted as being limited by any of these elements unless expressly recited within the attached claims.

For the purposes of the example embodiment of FIG. 1, various functions are shown to be performed on different programmable computing devices that communicate with each other over the Internet 109 These computing devices may include smartphones 111, laptop computers 110, tablets (not shown), and similar devices so long as the disclosed functionality of the mobile application described herein is supported by the particular computing device. One of ordinary skill will recognize that this functionality is grouped as shown in the embodiment for clarity of description. Two or more of the processing functions may be combined onto a single processing machine. Additionally, it may be possible to move a subset of processing from one of the processing systems shown here and retain the functionality of the present invention. The attached claims recite any required combination of functionality onto a single machine, if required, and all example embodiments are for descriptive purposes.

For all of the above devices that are in communication with each other, some or all of them need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects, and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method or algorithm is carried out or executed. Some steps may be omitted in some aspect or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example, an end-user computer system, a client computer, a network server or other server system, a mobile computing device (e.g., tablet computing device, mobile phone, smartphone, laptop or other appropriate computing device), a consumer electronic device, a music player or any other suitable electronic device, router, switch or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines or other appropriate virtual environments).

Figure 2A:
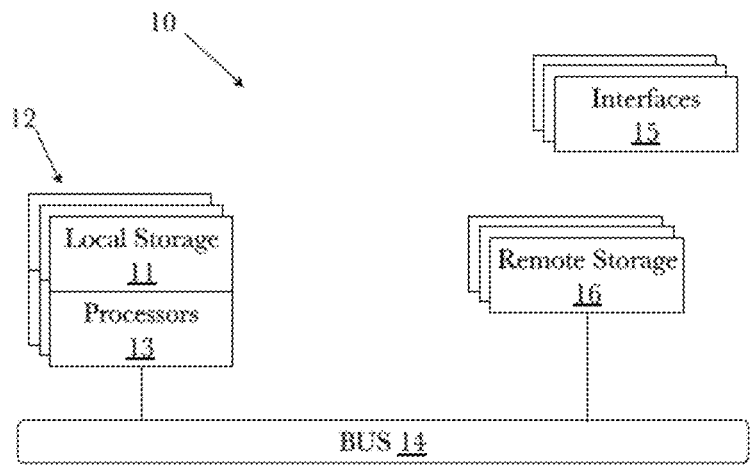
FIG. 2a is a block diagram illustrating an exemplary hardware architecture of a computing device.

Referring now to FIG. 2a, there is a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network, a metropolitan area network, a local area network, a wireless network, the Internet or any other network, using known protocols for such communication, whether wireless or wired.

In one aspect, computing device 10 includes one or more central processing units (CPU) 12, one or more interfaces 15, and one or more buses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing a CPU 12, local memory 11 and/or remote memory 16, and interface(s) 15. In at least one aspect, a CPU 12 may be caused to perform one or more of the different types of functions and/or operations under the control of software modules or components, which for example, may include an operating system and any appropriate applications software, drivers, and the like.

A CPU 12 may include one or more processors 13 such as for example, a processor from one of the Intel, ARM, Qualcomm, and AMD families of microprocessors. In some aspect, processors 13 may include specially designed hardware such as application-specific integrated circuits (ASICs), electrically erasable programmable read-only memories (EEPROMs), field-programmable gate arrays (FPGAs), and so forth, for controlling operations of a computing device 10. In a particular aspect, a local memory 11 (such as non-volatile random access memory (RAM) and/or read-only memory (ROM), including for example, one or more levels of cached memory) may also form part of a CPU 12. However, there are many different ways in which memory may be coupled to a system 10. Memory 11 may be used for a variety of purposes such as, for example, caching and/or storing data, programming instructions, and the like. It should be further appreciated that a CPU 12 may be one of a variety of system-on-a-chip-(SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may, for example, support other peripherals used with a computing device 10. Among the interfaces that may be provided are ethernet interfaces, frame relay interfaces, cable interfaces, DSL interfaces, token ring interfaces, graphics interfaces, and the like. In addition, various types of interfaces may be provided such as, for example, universal serial bus (USB), serial, thernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast ethernet interfaces, gigabit ethernet interfaces, serial ATA (SATA) or external SATA (ESATA) interfaces, high-definition multimedia interfaces (HDMI), digital visual interfaces (DVI), analog or digital audio interfaces, asynchronous transfer mode (ATM) interfaces, high-speed serial interfaces (HSSI), point of sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 2a illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and a server system (such as a server system described in more detail below).

Regardless of network device configuration, the system of an aspect may employ one or more memories or memory modules (for example, remote memory block 16 and local memory 11) configured to store data, program instructions for the general-purpose network operations or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device) or they may be removable such as swappable flash memory modules (such as "thumb drives" or other removable media designed for rapidly exchanging physical storage devices), "hot-swappable" hard disk drives or solid state drives, removable optical storage disks, or other such removable media, and that such integral and removable storage media may be utilized interchangeably. Examples of program instructions include both object code, such as may be produced by a compiler, machine code, such as may be produced by an assembler or a linker, byte code, such as may be generated by for example by a JAVA™ compiler and may be executed using a JAVA™ virtual machine or equivalent, or files containing higher level code that may be executed by the computer using an interpreter (for example, scripts written in Python™, Perl™, Ruby™, Groovy™, or any other scripting language).

Figure 2B:
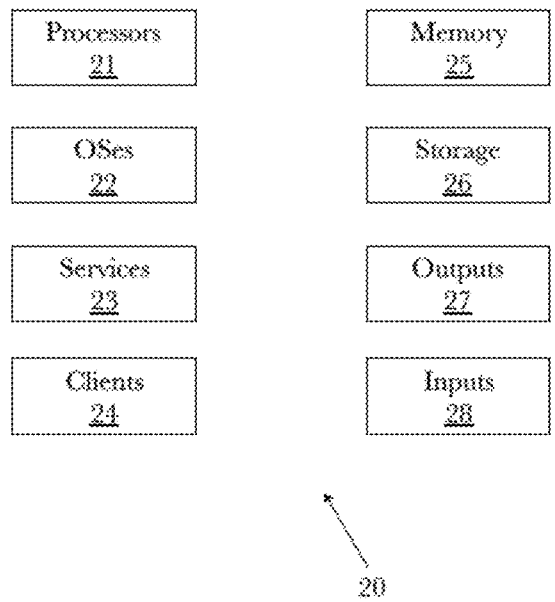
FIG. 2b is a block diagram illustrating an exemplary logical architecture for a client device.

In some aspects, systems may be implemented on a standalone computing system. Referring now to FIG. 2b, there is a block diagram depicting a typical exemplary architecture of one or more aspects or components thereof on a standalone computing system. A computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the LINUX™ operating system, ANDROID™ operating system, or the like. In many cases, one or more shared services 23 may be operable in system 20, and may be useful for providing common services to client applications 24. Services 23 may, for example, be WINDOWS™ services, user-space common services in a LINUX™ environment or any other type of common service architecture used with an operating system 22. Input devices 28 may be of any type suitable for receiving user input including, for example, a keyboard, touchscreen, microphone (for example, for voice input), mouse, touchpad, trackball or any combination thereof. Output devices 27 may be of any type suitable for providing output to one or more users, whether remote or local to system 20, and may include, for example, one or more screens for visual output, speakers, printers or any combination thereof. Memory 25 may be RAM having any structure and architecture known in the art for use by processors 21, for example to run software. Storage devices 26 may be any magnetic, optical, mechanical, memristor or electrical storage device for storage of data in digital form (such as those described above, referring to FIG. 2a). Examples of storage devices 26 include flash memory, magnetic hard drive, CD-ROM, and the like.

Figure 2C:
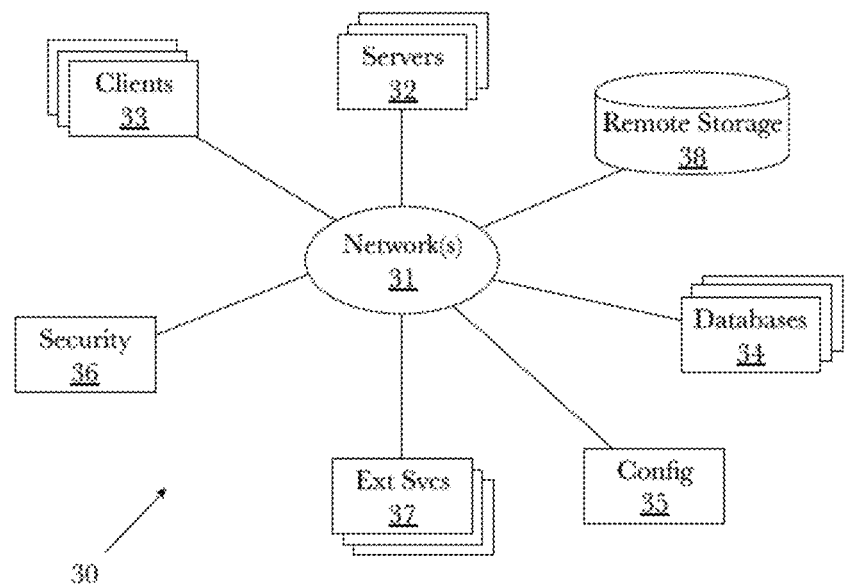
FIG. 2c is a block diagram showing an exemplary architectural arrangement of clients, servers, and external services.

In some aspects, systems may be implemented on a distributed computing network, such as one having any number of clients and/or servers. Referring now to FIG. 2c, there is a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in Fig. B. In addition, any number of servers 32 may be provided for handling requests received from one or more clients 33. Clients 33 and servers 32 may communicate with one another via one or more electronic networks 31, which may be in various aspects any Internet, wide area network, mobile telephony network (such as CDMA or GSM cellular networks), wireless network (such as WiFi, WiMAX, LTE, and so forth) or local area network (or indeed any network topology known in the art; the aspect does not prefer any one network topology over another). Networks 31 may be implemented using any known network protocols, including, for example, wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored on a server system 32 in the Cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and use a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web system. It should be understood by one having ordinary skill in the art that any configuration or security subsystems known in the art now or in the future may be used in conjunction with aspects without limitation, unless a specific security 36 or configuration system 35 or approach is required by the description of any specific aspect.

Figure 2D:
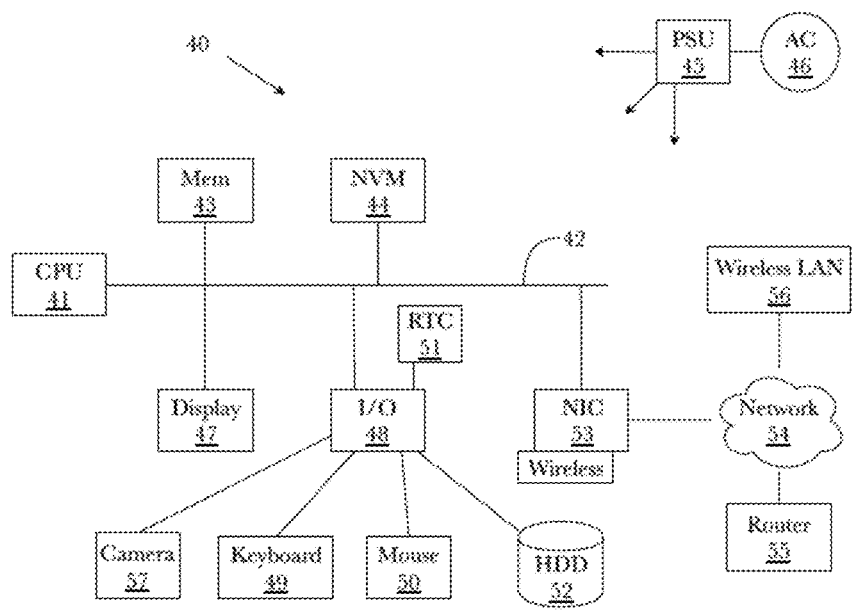
FIG. 2d is another block diagram illustrating an exemplary hardware architecture of a computing device.

FIG. 2*d* shows an exemplary overview of a computer system 40 as may be used in any of the various locations throughout the system. It is exemplary of any computer that may execute code to process data. Various modifications and changes may be made to a computer system 40 without departing from the broader scope of the system and method disclosed herein. A CPU 41 is connected to bus 42, to which bus is also connected to memory 43, nonvolatile memory 44, display 47, I/O unit 48, and network interface card (NIC) 53. An I/O unit 48 may, typically, be connected to peripherals such as a keyboard 49, pointing device 50, hard disk 52, real-time clock 51, camera 57, and other peripheral devices. A NIC 53 connects to a network 54, which may be the Internet or a local network, which local network may or may not have connections to the Internet. The system may be connected to other computing devices through the network via a router 55, wireless local area network 56 or any other network connection. Also shown as part of a system 40 is a power supply unit 45 connected, in this example, to a main alternating current (AC) supply 46. Not shown are batteries that could be present and many other devices and modifications that are well known, but are not applicable to, the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles or other integrated hardware devices).

In various aspects, functionality for implementing systems or methods of various aspects may be distributed among any number of client and/or server components. For example, various software modules may be implemented for performing various functions in connection with the system of any particular aspect, and such modules may be implemented to run on server and/or client components.

Figure 3:
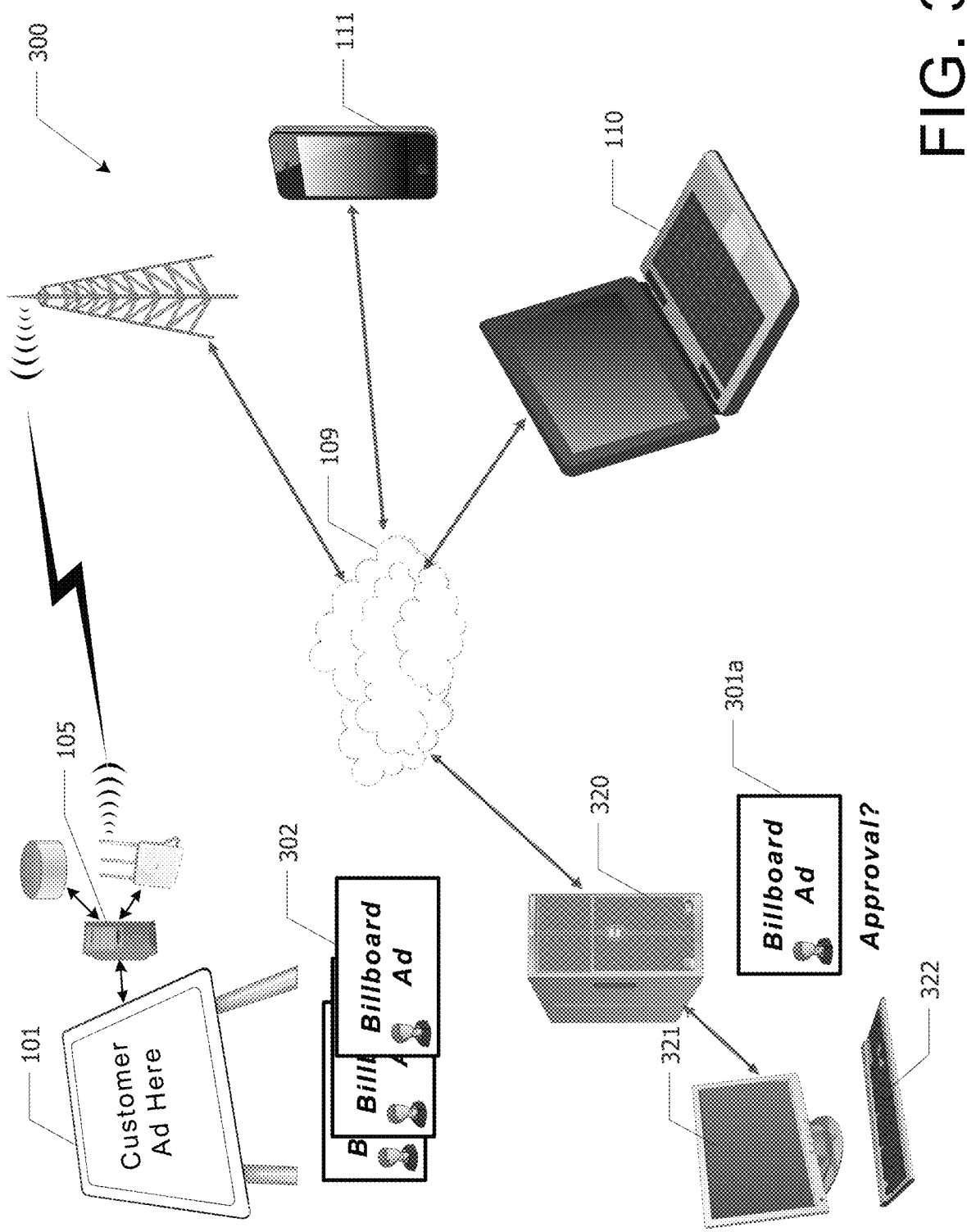
FIG. 3 illustrates another example embodiment of a system for providing a fully automated self-serve smart billboard according to the present invention.

FIG. 3 illustrates another example embodiment of a system for providing a fully automated self-serve smart billboard according to the present invention. Self-serve smart billboard system 300 includes a smart billboard 101, a user remote computer 110 or smart device 111, and a billboard operator server 320 connected together via the Internet 109. Content 301*a* may typically be created by users on remote computers 110 or be created by third parties that provide the content to user, including the billboard operator. Users may use these remote computer 110 or smart devices 111 to upload the content 301*a* to a billboard processing system 105 if authorized by billboard operators. Users may also upload the content 301*a* to billboard operator server 320 to obtain approval of the content. Once the customers receive notification of approval of the content, the users or billboard operator then upload the content 301*a* to the billboard processing system 105. The content 301*a* is typically displayed as a sequence of advertisements 302 similar to a slide show in which each advertisement is shown for a predetermined amount of time before the next advertisement is shown. Once all of the advertisements held in the billboard processing system 105 have been shown, the sequence of advertisements 302 is typically repeated.

The billboard operator may also choose which users may have an approval, disapproval, or recommendation message feature to directly upload content to the billboard 101. For example, a billboard operator may consider a frequent or continuous user or customer to be of good faith and is trusted by the billboard operator to have the option to self-serve the billboard without the approval, disapproval, or recommendation feature. Therefore, the billboard operator may choice which users may have direct upload access to a billboard. The billboard operator or owner may install software or a smart device application to any smart device 111 that allows the approval or disapproval of content and allows messaging to users by any connection means described herein, including but not limited to multimedia message services (MMS), Internet, email, Internet-based messaging services or via the invention's software or smart device application(s) or the operator's website.

The billboard operator may choose which users have the privilege to upload content to the billboard 101 without the billboard operator's permission or review the content 302*a* prior to the content being displayed on the billboard 101. The billboard operator may also install software or an application to any smart device 111 in order to perform the task of approval or the content selected by user to be displayed on the billboard 101. The system 300 also allows the billboard operator to monitor all or some activities of the content selected by the user or content displayed on one or more billboards.

With this system 300, the operator will have access to any contents in the server 320 and/or uploading content 302*a* to a billboards data storage system 105. The users may have the ability to change or control any features, parameters or settings of the billboard 101 as specified by the billboard operator via any means wireless and/or wired connection.

The Self-Serve Smart Billboard system 300 allow users and customers who are registered and/or approved with an online password protected web-based account to bypass the billboard operator and upload content directly to a billboard 101 or billboards of choice. This system 300 may be an add-on that will allow the transmission of content or file data to be managed by the system software or smart device application and allow users to select a billboard or multiple billboards of choice, to connect to the digital billboard via the Internet 109, and to upload content to be displayed on the smart billboards 101. The Self-Serve Smart Billboard system 300, including its operating software and/or smart device application, provides access to real time billboard advertising time and/or date availability to allow the users to select the date and/or time to display the content of choice. The system 300 and smart device application may have voice controlled operation of all or some of the system 300 software or web-based/smart device application features, setting or parameters. The system 100 also provides payment options via any means, including but not limited to, credit/debit card, bank account or third-party payment services including online third party services. The Self-Serve Smart Billboard system 300 may include solar panel attachments to the billboards 101 (not shown) to reduce power consumption.

The smart device 111 application may present real time maps with a user specified radius or distance showing location of billboards 101 and advertising time and/or dates available for purchase. Smart device 111 application may communicate with billboard operator server 320 to obtain map and advertising time slot availability. Users may use this data to select advertising time slots for their advertisements. The smart device 111 application may also provide users with an ability to use the camera of any smart device, to allow pictures or videos to be taken within the smart device 111 application, and to be sent to the user selected billboard 101 via any means or connection as described herein.

The smart device 111 application also permits users to edit the picture or videos taken before sending it to the billboard 101. The smart device 111 application's picture or video editing capabilities may include, but is not limited to, text placement, font, style or color selections, addition of figures or other images to the photos or videos or modifications to the quality of the pictures or videos including but not limited to contrast, brightness, resolution or special effects including but not limited to grayscale conversion, saturation, tint, blur, and filters.

Users may receive marketing information from any source including sales results, customer contacts and comments, and third party entities such as on-line demographic data sources related to locations close to the billboards 101 are displaying the content. These third party entities may identify changes in opinions, actions, and interests in audience members to whom the content displayed on the billboard 101. Using the changes in demographic data, users may estimate any effect the display of the content on the billboards 101 to create changes in the content and sign copy that may be automatically uploaded from the smart device 111 to redirect the content to obtain a desired results.

The billboard operator or owner has the ability to review user-selected content before it is uploaded to the user-selected billboard or billboards. The billboard operator or owner may then either approve the content and allow the Self-Serve Smart Billboard software/smart device application to upload the user selected content to the user selected billboard 101 or disapprove the content and send the user a message stating that the content selected will not be uploaded. This message may be sent to the user either through the Self-Serve Smart Billboard's server 320 software and/or smart device application. Via these messages, the billboard operator may also have the option to send recommendations of changes or fixes to the user's content before the content may be uploaded to the selected billboard 101.

Because customers are preparing the content for upload, the system 300 supports allowing customers to have their ad sign sponsored by another company. For example, a beverage or athletic shoe manufacturer may wish to sponsor ads from a non-profit community sorts organization where the content is divided into one or more picture segments and allows customer and/or the sign owner to display an ad or business messages that would usually occupy a smaller portion of the content or picture segment for the sponsoring company.

System 300 may determine and provide a traffic count option where allowed. This traffic count data may then be used or analyzed by anyone allowed access by the operator. The traffic counting may be accomplished by any type of digital camera where streaming data or contents are sent to an object recognition software or applications located or installed in any of the components. The system 300 may use the traffic count capabilities to automatically change the displayed content or contents to reflect previously collected data. This traffic count data may be collected by any means including, but not limited to, surveys, demographic data or Web collected data from Internet service providers or search engines or any search website such as for example, popular keyword searches.

Figure 4:
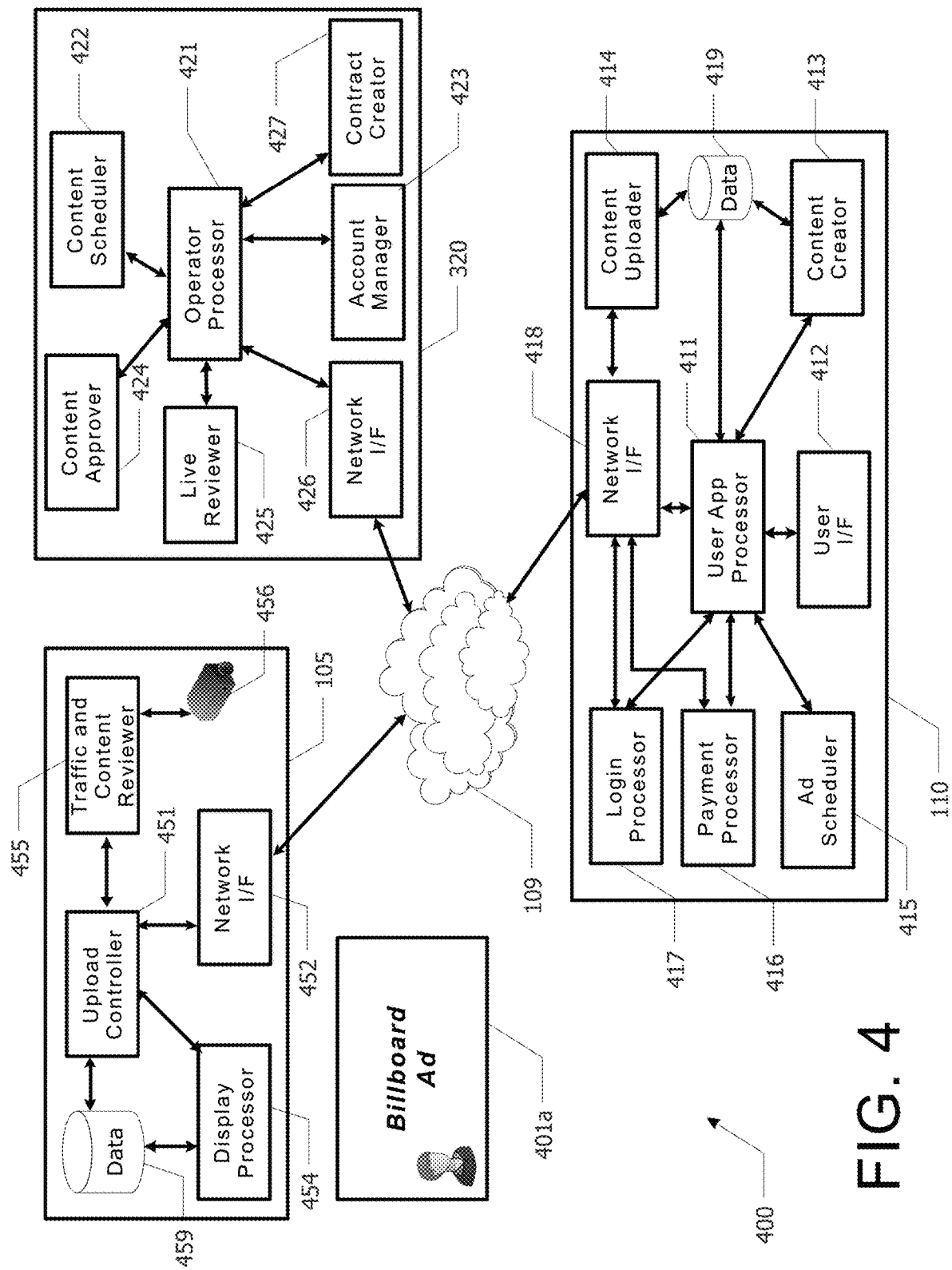
FIG. 4 illustrates a computing system of software components providing a system and method a fully automated self-serve smart billboard according to the present invention.

Some digital billboards 101 also have a digital camera attachment 456, as shown in FIG. 4, that allows the billboard operator or owner to monitor the contents displayed on the billboard sign copy remotely. Another optional feature to this invention is to include the capabilities to allow the user to access the digital camera's live stream images or videos and monitor that the selected content is being displayed on the sign copy to ensure that the content is being displayed correctly or satisfactorily.

The system 300 may also allow the operator to set no restrictions or any level or amount of restrictions on any user, such as but not limited to, how much content the user can upload, how long (time period) that contents can remain uploaded or which content can be uploaded as specified by the operator. The operator may generate a contract based upon a standard agreement template that is sent to the user for execution. This agreement may be created each time a user attempts to upload content to a billboard or may be created when a user creates an account that applies to all uploads of content until the terms are formally changed.

In other embodiments, a user device includes an identifier, including but not limited to, tokens, mobile directory number, international mobile identifier, machine access control address, mobile equipment identity, mobile identification numbers device ID, MAC address, openID, RFID (radio frequency identification), electronic serial number, barcode and unique directory address corresponding to the user and so forth. The invention's method and/or system may then identify the user or user device for any reason, for example, to determine privileges of users.

FIG. 4 illustrates a computing system of software components providing a system and method for providing a fully automated self-serve smart billboard according to the present invention. Smart Billboard system 400 consists of a user smart device 111, a billboard 101 with a display processing system 105, and a billboard operator server 320. Each of these components may consist of a set of processing components to implement the devices functionality. These processing components may be software running on a general purpose processing device, firmware running on an embedded processing component within the device, control logic operating within the device or some combination of one or more of these design approaches.

The user smart device 111 is constructed using a user app processor 411, a user interface 412, a content creator 413, a content uploader 414, an ad scheduler 415, a payment processor 416, a login processor 417, and a smart device network interface 418. The user app processor 411 provides the central control of the smart device processing to receive input from a user, to provide data to the user, and to instruct other processing elements of tasks to be performed.

The user interface 412 provides the smart device 111 an ability to communicate with the user. The user interface 412 includes any processing logic needed to receive input from a user and to provide data to the user based upon the type of smart device being used. For example, a smart phone or tablet support touch screen input devices. Some laptop devices do as well. Some of these devices accept input from keyboards and pointing devices such as a mouse or trackpad. The user interface 412 provides any processing needed to permit users to interact with the application using whichever input and display is being used.

The content creator 413 provides users with an ability to create and/or modify images or videos that may be used as content for display on a billboard 101. The content may be created using an external product or may be received from a third party. The content creator 413 permits a user to receive this data in addition to creating the content herein. Once the content has been determined to be complete, the content is available for other processing components to use.

The content uploader 414 provides the user with an ability to upload content to billboard data processing system 105 and billboard operator server 320 as needed. The content uploader 414 communicates with these external processing systems via the smart device network interface 418.

The ad scheduler 415 provides the user with an ability to select date and time slots on one or more billboards 101 for the user content 401a to be displayed. The ad scheduler 415 communicates with the billboard operator server 320 via the smart device network interface 418 to obtain data identifying the date and time slots available to the user. The ad scheduler 415 presents the data to the user via the user interface 412 and receives the user's selections. The user selections may be sent to the billboard operator server 320 for purchase.

The payment processor 416 provides the user with an ability to purchase selected date and time slots for uploaded content. The payment processor 416 communicates with billboard operator server 320 with payment information, such as bank payment numbers, credit card numbers, and the like. The billboard operator server 320 uses this provided payment information to request payment on behalf of the user.

The login processor 417 provides users with an ability to create and login to accounts on billboard operator server 320 and billboard processing system 105 when operations are to be performed. The login processor may use a login username and password combination, may use additional multi-step authorization, and any other known authentication and authorization process supporting remote access to processing systems over the Internet 109. The login processor 417 may retain some or all of the login information for transmission when needed as well as requiring the user to enter some information to authenticate the user to be someone permitted to perform processing tasks.

The smart device network interface 418 provides a network connection from the smart device 111 to the internet 109 allowing communications to and from remote systems. The network interface 418 provides all processing and data formatting needed to support a particular communications protocol and or communications channel supported by the smart device 111.

The billboard display processing system 105 may include an upload controller 451, a billboard network interface 452, a display processor 454, a traffic and content receiver 455, an external imaging device 456, and a billboard system data store 459. The upload controller 451 provides the central control of the billboard display processing system 105 to receive content from a user, to receive content from the billboard operator server 320, to display uploaded content per its assigned schedule, and to instruct other processing elements of tasks to be performed. Content data received from users and operators may be stored onto the billboard system data store 459 for later access.

Components of the billboard display processing system 105 may be located in various embodiment, either as an integral part of the billboard display itself or as an external device connected to the display. In a preferred embodiment, the billboard display processing system 105 is located externally. The billboard display processing system 105 converts image data from a computer or other smart device into a code or language supported by the billboard display.

The billboard network interface 452 provides a network connection from the billboard processing system 105 to the Internet 109 allowing communications to and from remote systems. The network interface 452 provides all processing and data formatting needed to support a particular communications protocol and or communications channel supported by the billboard processing system 105.

The display processor 454 retrieves content data from the billboard system data store 459 and displays the content onto the billboard 101. The display processor 454 is provided a schedule associated with each content item uploaded to the billboard processing system 105 and uses the schedule to determine when any particular content item is to be displayed. The display processor typically generates a sequence of content images similar to a slide show using all of the content items scheduled for display during a current time period. The display processor 454 may also locally store data of the content, if desired, in addition to storing the content data on the billboard system data store 459.

The display processor 454 may add text or special effects like smooth transitions or slide show sequencing to the content. The display processor may also add sound if speakers are connected to the billboard data processing system 105. The billboard data processing system 105 may include connections of all types like HDMI, VGA, and similar display protocols in addition to any camera connections all optional. Most of these additional features are optional and may not used since most local codes don't allow sound or excessive video.

The traffic and content receiver 455 receives imaging data from the external imaging device 456 to provide imaging data to billboard operators and users. The traffic and content receiver 455 processes the image data as needed and sends it to a desired party upon receipt of a request. If the external imaging device 456 is directed towards a nearby roadway, or may be instructed to move to provide a view of the nearby highway, the traffic and content receiver 455 may process the images over a time period using appropriate detection processing to determine a number of vehicles have passed by the billboard 101 over any given time period. From the number of vehicles detected, an estimate for an audience may be calculated.

The external imaging device 456 is an imaging device capable of transmitting images and/or video to the traffic and content receiver 455 as needed. The traffic and content receiver 455 may also provide commands to the external imaging device 456 to cause it to change is direction of image capture to support both traffic analysis as well as billboard content review. Of course, the billboard display processing system 105 may also include multiple imaging devices as desired.

The billboard operator server 320 may include an operator processor 421, a billboard content scheduler 422, an account manager 423, a contract/invoice generator 427, a content approver 424, a live image receiver 425, and a billboard operator server network interface 426. The operator processor 421 provides the central control of the billboard operator server 320 to receive content and other communications from a user, to provide approval and disapproval messages regarding content to the user, to upload to the billboard processing system 105 content for display using a defined schedule, and to instruct other processing elements of tasks to be performed.

The billboard content scheduler 422 maintains date and time slot data for all of the supported billboards. The billboard content scheduler 422 provides available time slots to smart devices 111 upon request, receives date and time slot selections from smart devices 111, and processes payment requests associates with selected time slots by users.

The account manager 423 permits users to set up accounts via their smart devices 111 that will permit them to set up payment options, to set up advance approval of content for the account, and to provide all necessary authentication and authorization operations for when users upload and schedule content for display onto billboards 101. The account manager 423 works with the contract/invoice generator 427 to generate a contract and/or an invoice based upon a standard agreement template that is sent to the user for execution. This agreement may be created each time a user attempts to upload content to a billboard or may be created when a user creates an account that applies to all uploads of content until the terms are formally changed.

The content approver 424 receives proposed content from a user's smart device 111 and presents it to an operator for approval. The content approver 424 will receive the billboard operator's determination and forward it to the user for correction or to the appropriate device to cause the content to be automatically uploaded to the billboard data processing system 105.

The live image receiver 425 receives live image data from the billboard data processing system 105 to supply traffic and content device data for use by operators and users. The data stream received may be displayed to an operator on a display device 321 or stored onto the billboard operator server 320 for later retrieval.

The billboard operator server network interface 426 provides a network connection from the billboard operator server network 320 to the Internet 109 allowing communications to and from remote systems. The network interface 426 provides all processing and data formatting needed to support a particular communications protocol and/or communications channel supported by the billboard operator server network 320.

The example embodiments described above is presented as if the central server 320 and the billboards 101 are owned and operated by the same owner or legal entity. In alternate embodiments, the central server 320 may operate as a marketplace in which any billboard owner may add their billboard to the central server 320 in order for system 100 to be used to sell ad slots. Customers can then log in to the system 100, the account manager 423 may determine which owners' billboards may be used to purchase ad time slots. This limitation on use of subset of billboards accessible by a user may be used when reviewing available time slots, when purchasing one or more time slot, and when uploading content to a billboard. This marketplace may also be an "open market" that allows other third parties to sell any slots available on any billboard as a broker or agent.

Figure 5:
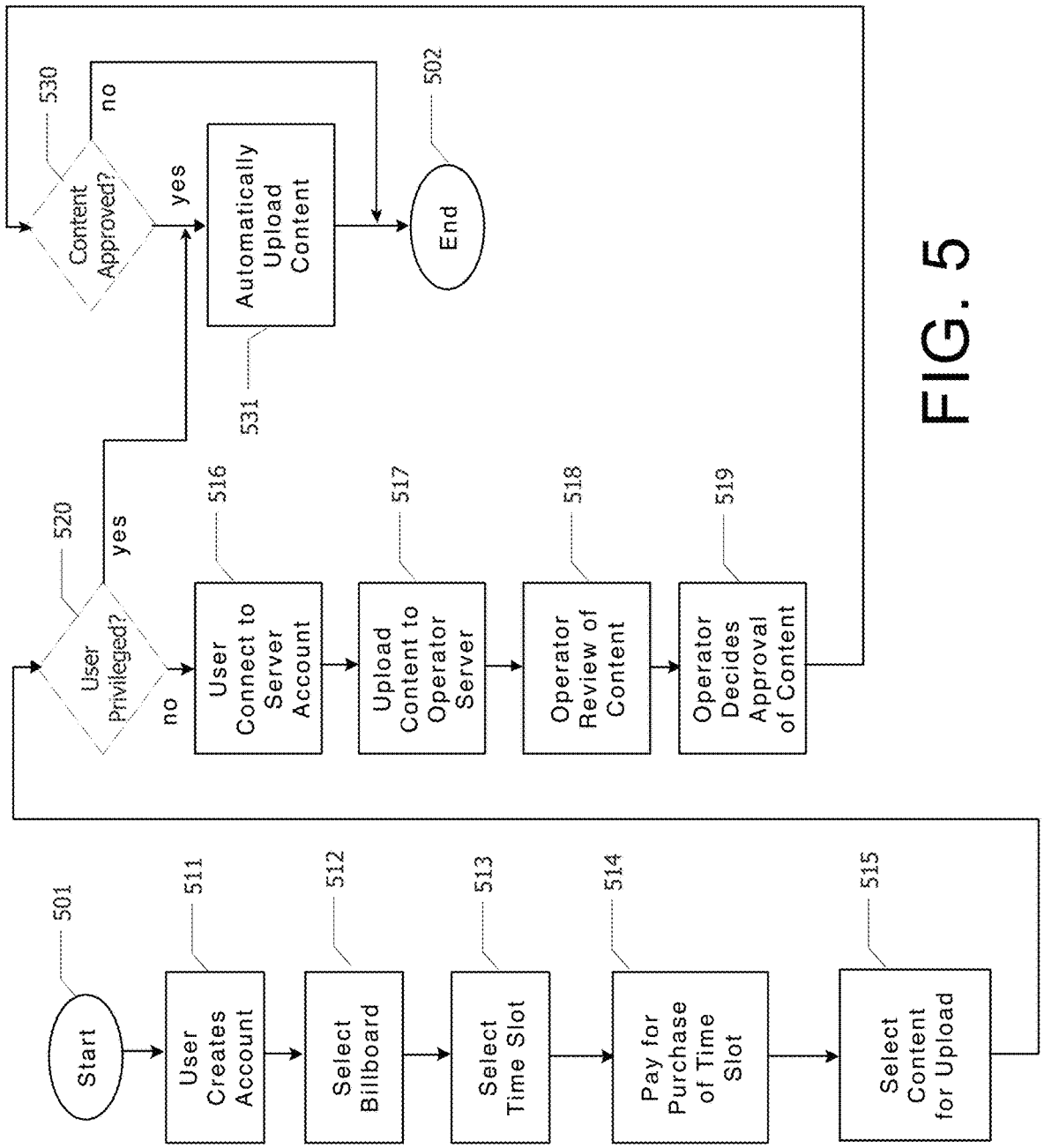
FIG. 5 illustrates a flowchart corresponding to a method performed by software components providing a fully automated self-serve smart billboard according to the present invention.

FIG. 5 illustrates a flowchart corresponding to a method performed by software components providing a system and method for providing a fully automated self-serve smart billboard according to the present invention.

The user may use any user device or smart device to access a website or websites provided by the billboard operator to access data or content, transmit data or content to and from the server, computer system, the operator websites, or billboards. The system 400 allows the operator website or operator smart device 110-111 to be used by the users to create and/or register an account in step 511, which allows the user to login with security username and/or password or passcode (or any other information to identify the user such as but not limited to address or phone number) and search billboards organized in any format, such as but not limited to, a list, interactive map with a specified radius/distance or search capabilities to locate a billboard or billboards by keyword(s) of any criteria.

In step 512, the user then selects the billboard of choice to determine what if any available ad time slots are available to permit the user, in step 513, to select available time and/or date slots to display user-selected content. The user may then pay in step 514 with any payment form as above or use a financial or monetary recurring or open account of any type. The user selects the content to be uploaded to selected billboards in step 515 and test step 520 determines if the user is privileged to upload content to the operator's billboards without the operator's review and approval. If test step 520 determines that the user content requires prior approval, the user connects to an operator server 320 to transfer the content for approval in step 516. The content is sent or transferred to the operator's smart device or server for approval/disapproval in step 517.

The operator may review the user-selected content in a recognizable format in step 518 permitting the operator to grant approval or to indicate disapproval of the content. The user may be sent a message in any format (text, sound, video, images) to provide recommendations or "feedback" to the user(s) regarding any user-selected content in step 519. Test step 530 determines whether an approval or disapproval decision has been made. If test step 530 determines that content received a disapproval decision, the process ends 502.

If test step 530 determines that the content received an approval decision, the content is automatically uploaded in step 531 to the user-selected billboards without the operator having to login to the billboard's software or application to upload the content and the process ends 502.

Returning to test step 520, if the test step determines that the user is privileged to upload content to the operator's billboards without the operator's review and approval, the content is automatically uploaded in step 531 to the user-selected billboards without the operator having to login to the billboard's software or application to upload the contents and the process ends 502.

With the invention, the operator may also have the option to be notified of some or all content that is being selected or uploaded by the users, and these pending images/contents or uploaded images/contents may be viewed by the operator(s) who then may remove or delete any content at any time and/or send messages to users by any means as above. For example, the operator may want to send messages to users regarding recommendations for better advertising content or to notify users if they have violated the terms or criteria to upload content to the operator's billboards. Therefore, the invention's method and/or system may also allow the billboard operator to function as an on-call "monitor." The operator may choose one or more billboards and may choose who has the final decision regarding the approval, disapproval, messaging to users or deletion of content from the billboard's memory or the invention's server(s), computer system(s) or website(s).

The embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise. The phrase "connected to a billboard" means any component or smart device that is capable to connect to a billboard or billboards by any means wired and/or wireless, regardless if a server or server(s) or computer system(s) is required in any step of the connection process. The phrase "to be displayed on a billboard or billboards" or "display on a billboard or billboards" or "displayed on the billboard" or "to display the content(s) of choice" or "contents displayed" or "displayed content" refers to displaying the content's or contents' representative words, letters, numbers, designs, figures, images, videos, sounds or other symbolic presentation to the sign copy of the billboard as selected by users or operators in a format that is recognizable by the selected billboard(s) to display representative and recognizable content to the audience. Any singular term used in this present patent application is applicable to its plural form even if the singular form of any term is used.

In the present application, all or any part of the invention's software or application(s) or smart device application(s) may be installed on any of the user's or operator's smart device(s), any server(s) or computer system(s) or web application(s) required to allow communication, control (including but not limited to control of parameters, settings such as for example, sign copy brightness, contrast, ambient light sensor settings . . . etc.), transfer of content(s) or data between any combination of the components.

What is claimed is:

1. A system for providing automated remote digital advertising, the system comprises:
    a user device for selecting and purchasing enabling a customer-purchasing advertisement to select and purchase an ad time slot and uploading content;
    a billboard capable of displaying digital copy and having a display processing system coupled to a public, wide area network; and
    a billboard operator server for communicating with one or more user devices supporting customer-purchasing advertisement's user accounts and content approval, wherein content approval comprises allowing display of content based at least in part on at least one of a review of the context and a customer-purchasing advertisement's history of use, wherein the billboard operator server is configured to provide a set of privileges to one or more customer-purchasing advertisement such that the one or more customer-purchasing advertisement advertiser can upload content to the billboard without additional permissions and review.

2. The system according to claim 1, wherein the user device comprises:
    a user app processor;
    a user interface;
    a content uploader;
    a login processor; and
    a user device network interface.

3. The system according to claim 2, wherein the user device further comprises:
    a content creator;
    an ad scheduler; and
    a payment processor.

4. The system according to claim 1, wherein the billboard display processing system comprises:
    an upload controller;
    a billboard network interface;
    a display processor; and
    a billboard system data store.

5. The system according to claim 4, wherein the billboard display processing system further comprises:
    a traffic and content receiver; and
    an external imaging device.

6. The system according to claim 1, wherein the billboard operator server comprises:
    an operator processor;
    a billboard content scheduler;
    a content approver; and
    a billboard operator server network interface.

7. The system according to claim 6, wherein the billboard operator server further comprises:
    an account manager;
    a contract/invoice generator; and
    a live image receiver.

8. The system according to claim 1, wherein the content comprises image data representing sign copy.

9. The system according to claim 1, wherein the content further comprises video data representing sign copy.

10. A system for providing automated remote digital advertising, the system comprises:
    a user device for selecting and purchasing an ad time slot and uploading content, the user device comprising:
        a user app processor;
        a user interface;
        a content uploader;
        a login processor; and
        a user device network interface;
    a billboard capable of displaying digital copy and having a display processing system coupled to a public, wide area network, the display processing system comprises:
        an upload controller;
        a billboard network interface;
        a display processor;
        a traffic and content receiver;
        an external imaging device;
        an account manager;
        a contract/invoice generator;
        a live image receiver; and
        a billboard system data store; and
    a billboard operator server for communicating with one or more user devices supporting customer-purchasing advertisement's user accounts and content approval, wherein the billboard operator server is configured to provide a set of privileges to one or more customer-purchasing advertisement such that the one or more customer-purchasing advertisement can upload content to the billboard without additional permissions and review, the billboard operator server comprises:

a billboard content scheduler;
a content approver, wherein the content approver allows display of content based at least in part on at least one of a review of the context and a customer-purchasing advertisement's history of use; and
a billboard operator server network interface.

11. The system according to claim 10, wherein the content contains sponsorship data in addition to the sign copy.

12. The system according to claim 10, wherein the billboard operator server provides an open marketplace offering sale of content time slots on behalf of third-party sellers.

13. A method for providing a fully automated self-serve smart billboard, the method comprising:
creating a user account, the user account having user account information and payment information;
scheduling content into one or more time slot associated with a billboard, the billboard being capable of displaying digital copy and having a display processing system coupled to a public, wide area network;
attempting to upload content to the billboard;
if the user account permits automatic uploads, uploading the content for display on the billboard during a scheduled time slot;
wherein permission for automatic uploads depends at least in part on at least one of a review of the context and a user's history of use,
wherein the permission for automatic uploads comprises a set of privileges to one or more users such that the one or more users can upload content to the billboard without additional permissions and review;
if the user account prohibits automatic uploads, perform the following:
uploading content to a central server;
receiving an approval decision from an operator using the central server;
if the approval decision provides authorization, uploading the content for display on the billboard during a scheduled time slot, otherwise receiving notification of reasoning supporting the approval decision.

14. The method according to claim 13, wherein the method further comprising:
receiving the content onto the user device; and
reviewing the content prior to uploading to the billboard.

15. The method according to claim 13, wherein the method further comprising:
creating the content on the user device; and
reviewing the content prior to uploading to the billboard.

16. The method according to claim 13, wherein the scheduling content comprises:
receiving available time slot data associated with one or more billboards;
selecting one or more time slots for displaying the content; and
purchasing the selected time slots.

17. The method according to claim 13, wherein the content contains sponsorship data in addition to the sign copy; and
the billboard operator server provides an open marketplace offering sale of content time slots on behalf of third-party sellers.

18. A non-transitory computer readable storage media containing encoded data that when read and executed by a programmable computing system implements a method for providing a fully automated self-serve smart billboard, the method comprising:
creating a customer-purchasing advertisement's user account, the user account having user account information and payment information;
receiving available time slot data associated with a billboard, the billboard being capable of displaying digital copy and having a display processing system coupled to a public, wide area network;
selecting one or more time slots for displaying the content; and
purchasing the selected time slots;
receiving the content onto the user device;
reviewing the content prior to uploading to the billboard based at least in part on a customer-purchasing advertisement's history of use;
attempting to upload content to the billboard.

19. The non-transitory computer readable storage media according to claim 18, wherein the content is changed and uploaded to the billboard replaying existing content based upon marketing data generated after the content was first uploaded.

20. The non-transitory computer readable storage media according to claim 19, wherein the content contains sponsorship data in addition to the sign copy; and
the billboard operator server provides an open marketplace offering sale of content time slots on behalf of third-party sellers.

* * * * *